(12) United States Patent
Tinglow et al.

(10) Patent No.: US 8,829,716 B2
(45) Date of Patent: Sep. 9, 2014

(54) ENERGY STORAGE DEVICE FOR A POWER COMPENSATOR AND A METHOD FOR CONTROL THEREOF

(71) Applicants: Fredrik Tinglow, Arboga (SE); Falah Hosini, Vasteras (SE); Tomas Larsson, Vasteras (SE)

(72) Inventors: Fredrik Tinglow, Arboga (SE); Falah Hosini, Vasteras (SE); Tomas Larsson, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/661,819

(22) Filed: Oct. 26, 2012

(65) Prior Publication Data
US 2013/0049472 A1 Feb. 28, 2013

Related U.S. Application Data

(63) Continuation of application No. PCT/EP2010/055659, filed on Apr. 27, 2010.

(51) Int. Cl.
*H02J 7/00* (2006.01)

(52) U.S. Cl.
CPC .................................. *H02J 7/0016* (2013.01)
USPC ................. 307/71; 307/65; 307/66; 320/117; 320/118; 320/119; 320/120; 320/121

(58) Field of Classification Search
CPC ........ H02J 9/062; H02J 7/0024; H02J 7/0016
USPC ............... 307/43–87; 320/116–123
See application file for complete search history.

(56) References Cited

U.S. PATENT DOCUMENTS

| 5,227,259 | A | 7/1993 | Weaver et al. |
| 5,952,815 | A * | 9/1999 | Rouillard et al. ............. 320/116 |
| 5,986,909 | A | 11/1999 | Hammond et al. |
| 6,271,646 | B1 * | 8/2001 | Evers et al. ................... 320/122 |
| 6,417,646 | B1 * | 7/2002 | Huykman et al. ............. 320/122 |
| 6,599,655 | B2 * | 7/2003 | Johnson et al. ................. 429/50 |
| 6,882,334 | B1 | 4/2005 | Meyer |
| 6,933,703 | B2 * | 8/2005 | Dubac et al. ................... 320/121 |

(Continued)

FOREIGN PATENT DOCUMENTS

| WO | 9905766 A1 | 2/1999 |
| WO | 9905767 A1 | 2/1999 |

OTHER PUBLICATIONS

International Preliminary Report on Patentability; Application No. PCT/EP2010/055659; Completed: Aug. 22, 2012; 10 pages.

(Continued)

*Primary Examiner* — Jared Fureman
*Assistant Examiner* — Alfonso Perez Borroto
(74) *Attorney, Agent, or Firm* — St. Onge Steward Johnston & Reens LLC

(57) ABSTRACT

An energy storage device for a power compensator including a battery stack including a plurality of battery units connected in series, each of the battery units including one or more parallel-connected battery modules including a plurality of battery cells, where each battery unit further includes a bypass switch connected in parallel with the battery modules and the energy storage device comprises a control unit which is operatively connected to the bypass switches and adapted to receive information on a failure in any of the battery modules and to close the bypass switch in order to bypass the battery unit in case of a failure in any of the battery modules of the battery unit.

6 Claims, 4 Drawing Sheets

(56) References Cited

U.S. PATENT DOCUMENTS

| | | | |
|---|---|---|---|
| 7,456,610 B2 * | 11/2008 | Yamashita | 320/119 |
| 2005/0077874 A1 * | 4/2005 | Nakao | 320/116 |
| 2008/0258683 A1 * | 10/2008 | Chang | 320/112 |
| 2009/0289598 A1 * | 11/2009 | Tsukamoto et al. | 320/118 |
| 2010/0079108 A1 * | 4/2010 | Monden et al. | 320/116 |
| 2011/0084663 A1 * | 4/2011 | Troxel et al. | 320/118 |

OTHER PUBLICATIONS

International Search Report Application No. PCT/EP2010/055659 Completed: Feb. 2, 2011; Mailing Date: Feb. 11, 2011 11 pages.

* cited by examiner

ENERGY STORAGE DEVICE FOR A POWER COMPENSATOR AND A METHOD FOR CONTROL THEREOF

FIELD OF THE INVENTION

The present invention relates to an energy storage device for a power compensator comprising a battery stack including a plurality of battery units connected in series, each of the battery units comprising one or more parallel-connected battery modules including a plurality of battery cells. The present invention further relates to a method for handling a failure in the energy storage device. The voltage level of the energy storage device is in the range of at least 3 kV, preferably at least 10 kV.

BACKGROUND OF THE INVENTION

Within flexible alternating current transmission systems (FACTS) a plurality of control apparatus are known. One such FACTS apparatus is a static compensator (STATCOM). A STATCOM comprises a voltage source converter (VSC) having an AC side connected to a high voltage electrical power system and a DC side connected to a temporary electric power storage means such as capacitors. The STATCOM can supply reactive power to, or absorb reactive power from, the electrical power system. In another apparatus, in the following denoted power compensator, a dc power source is connected to the STATCOM in order to perform also active power compensation. The construction may be used e.g. as a spinning reserve and for compensating for fluctuating energy levels in the power system.

If the dc power source is a high voltage battery a large number of battery cells have to be connected in series to match the dc voltage of the electrical power system. The dc power source includes a number of series- and/or parallel-connected battery cells, each having a voltage of approximately 3-4 V, arranged in battery modules. One or more battery modules are in turn parallel-connected to form a battery unit and several battery units may be series-connected to form a battery stack. A plurality of battery stacks can be series-connected to form a battery string. Moreover, to obtain a desired amount of electric energy (duration of active power) of the dc power source, a number of battery strings could be connected in parallel.

As mentioned above the battery unit includes one or more battery modules connected in parallel. The maximum amount of energy stored in the high voltage battery will be proportional to the number of parallel-connected battery modules. However, even if a single battery module would satisfy the requirements on the amount of stored energy, such a design would not be possible for power compensator availability reasons. With only a single battery module in the battery unit a failure will result in an emergency shut-down of the entire power compensator. With two modules in parallel per battery unit a single failure does not require an immediate shut-down of the power compensator. However, the probability of a failure in any of the modules will increase in proportion to the number of battery modules in the dc power source. Since the number of battery modules in the dc power source is very large there will be a clear risk of a battery module failure between the scheduled service and maintenance intervals. When a module failure occurs in a battery unit there is only one non-failed module left in said battery unit and the power compensator has to be shut-down due to the increased risk of an emergency shut-down of the power compensator as described above. Accordingly, to avoid frequent emergency shut-downs of the power compensator and to secure a continuous provision of necessary energy at least three modules in parallel are needed regardless of the actual requirements of the amount of stored energy, which consequently limits the flexibility of the system for different energy storage needs.

Another problem with the mentioned high voltage battery is the capacity reduction caused by a single battery module failure. If, for example, three battery modules are connected in parallel a failure in a single module in the whole string of possibly more than one hundred battery units in series would lead to a capacity reduction of 33%. The corresponding capacity reduction for four or five modules in parallel is 25% and 20% respectively. A solution to this problem is to add a redundant module in each battery unit. This however is a very costly solution. Alternatively, another battery string could be connected in parallel with the existing string but this would increase the cost and size of the power compensator even further.

Another problem with the high voltage battery described above is that the complete battery string would be unavailable during service and maintenance.

SUMMARY OF THE INVENTION

It is an object of the invention to provide an energy storage device which overcomes or at least alleviates the above-mentioned problems.

According to one aspect of the invention this object is achieved by an energy storage device for a power compensator.

The energy storage device for a power compensator may comprise a battery stack including a plurality of battery units connected in series, each of the battery units comprising one or more parallel-connected battery modules including a plurality of battery cells, characterised in that each battery unit further comprises a bypass switch connected in parallel with the battery modules and the energy storage device comprises a control unit which is operatively connected to the bypass switches and adapted to receive information on a failure in any of the battery modules and to close the bypass switch in order to bypass the battery unit in case of a failure in any of the battery modules of the battery unit.

When the control unit receives information on a failure in any of the battery modules it may send a bypass order to the bypass switch of the corresponding battery unit and consequently create a bypass for the load current. The bypassed battery unit will no longer contribute to the amount of energy stored in the energy storage device. On the other hand, the lost capacity of the energy storage device is reduced to only that of the bypassed battery unit including only a few battery modules. In case redundant battery units are available, the loss of energy can be compensated for.

Without bypassing the battery unit, the lost capacity of the energy storage device would be much higher. The lost capacity would equal the energy of a battery module times the number of battery units in the battery string, and this amount is much larger than the amount of energy in a battery unit. The load current will flow through each of the battery units and with no bypassing the load current also have to flow through the battery unit with the failed battery module and which apparently has a reduced capacity. Consequently the load current flowing through the energy storage device has to be adapted to the capacity of the battery unit with the failed battery module.

According to an embodiment of the invention each battery unit includes a battery module supervision unit adapted to communicate with the control unit via a communication link and adapted to detect a failure in any of the battery modules and upon detecting a failure to send information on the failure to the control unit, the device further comprising a communication management module adapted to detect when said communication link is broken and upon detecting that the link is broken to close the bypass switch in order to bypass the battery unit.

In case the battery module supervision unit has detected a failure in any of the battery modules it will send information on the failure via a communication link to the control unit which will send a bypass order to close the bypass switch in order to bypass the battery unit. However, in case the communication link is broken this information cannot be received by the control unit and the battery module supervision unit 17-20 is unable to receive an order from the control unit to bypass the battery unit. In this situation the communication management module is adapted to detect the broken communication and to close the bypass switch in order to bypass the battery unit in a controlled manner.

According to an embodiment of the invention, the device further includes current controlling means adapted to control the current through the battery stack, each of the battery units includes a bypass detecting element adapted to detect if the bypass switch is closed and upon detecting that the bypass switch is closed forward information that the bypass switch is closed, the current controlling means is adapted to receive information that the bypass switch is closed and to control the current based thereon.

In order to close the bypass switch in a safe and controlled way the closing of the switch will not be performed unless the current flown through the battery unit is below a threshold value. Similarly, the current controlling means will not start to increase the current through the battery device unless it has received information from the battery module supervision unit 17-20 that the switch has been successfully closed.

According to an embodiment of the invention the bypass detecting element is adapted to send the information that the bypass switch is closed to the communication management module of a neighbouring battery unit which is configured to forward the information to the current controlling means.

As mentioned above the bypass switch will not be closed unless the current flown through the battery unit is below a threshold value and the current controlling means will not start to increase the current through the battery device unless it has received information from the bypass switch that the switch has been successfully closed. However, in case the communication link is broken, the information from the bypass switch that the switch has been successfully closed cannot be received by the control unit and the communication management module will on its own volition close the bypass switch without interference from the control unit. By letting the bypass detecting element send the information that the bypass switch is closed to the communication management module of a neighbouring battery unit, which in turn forwards the information to the current controlling means, this problem can be solved.

According to a second aspect of the invention this object is achieved by a method for bypassing a battery unit in an energy storage device.

A method for bypassing a battery unit in an energy storage device being connected in parallel with a power converter, the energy storage device comprising a battery stack including a plurality of battery units connected in series, each of the battery units comprising at least two parallel-connected battery modules including a plurality of battery cells connected in series with a module contactor, is characterised by:

controlling a dc-voltage output from the converter to reduce the current through the battery stack to be below a threshold value, opening the contactor in each of the parallel-connected battery modules of the battery unit, and closing a bypass switch connected in parallel with the battery modules to bypass the battery unit.

BRIEF DESCRIPTION OF THE DRAWINGS

The present invention will be more fully described by way of example with reference to the accompanying drawings in which.

DETAILED DESCRIPTION OF THE INVENTION

Figure 1:
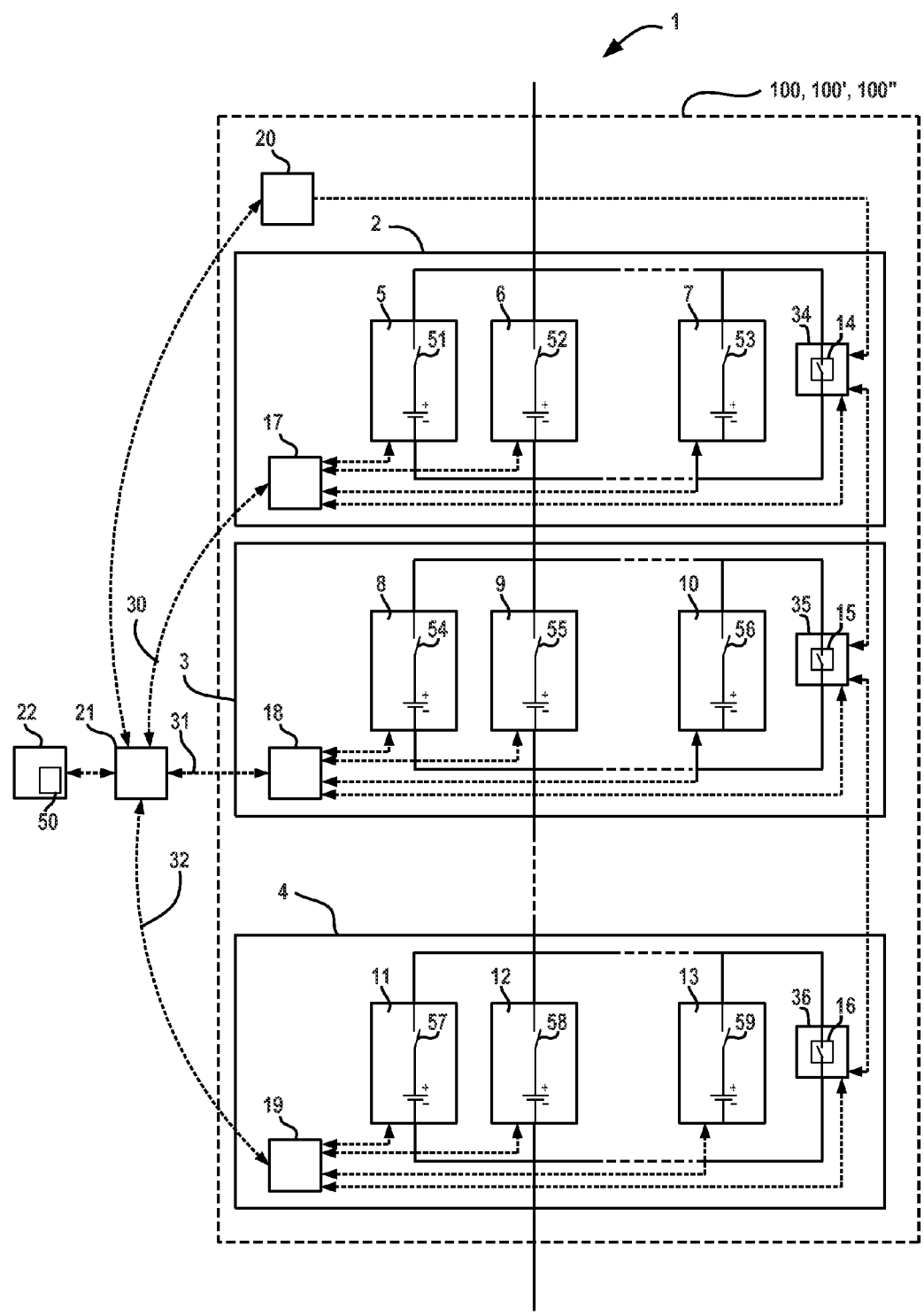
FIG. 1 shows a schematic figure of an embodiment of an energy storage device in accordance with the present invention.
Figure 3:
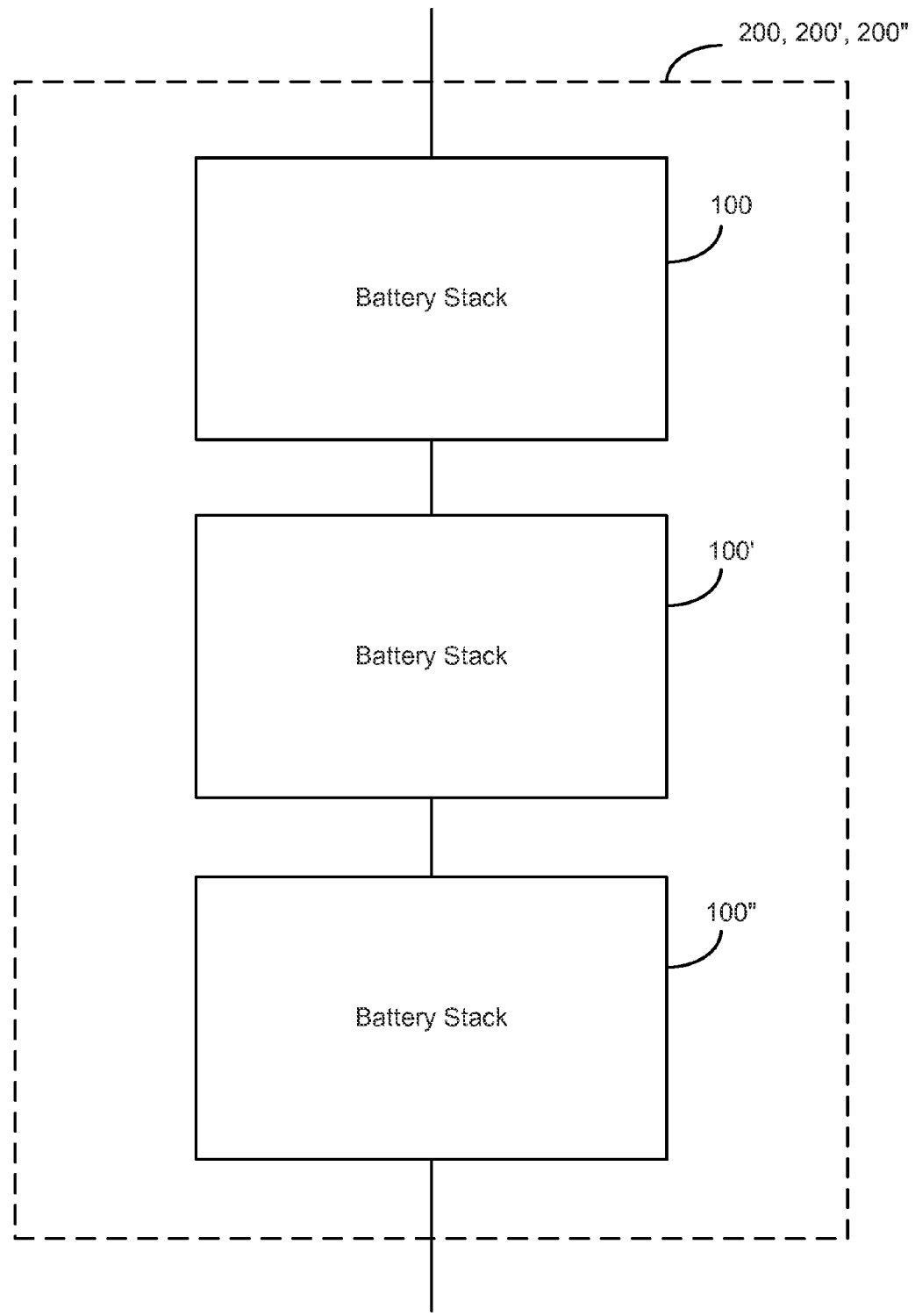
FIG. 3 is a block diagram depicting the interconnection of the battery stacks according to FIG. 1.
Figure 4:
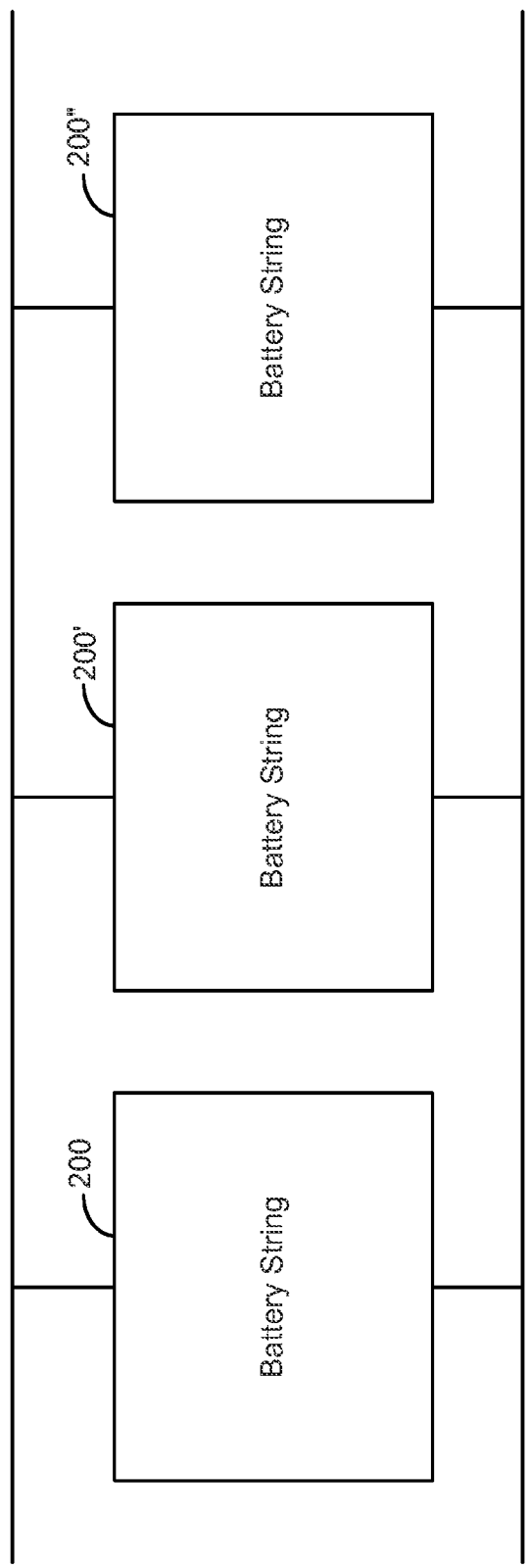
FIG. 4 is a block diagram depicting the interconnection of the battery strings according to FIG. 3.

In FIG. 1 an embodiment of an energy storage device 1 for a power compensator according to the invention is shown. The energy storage device 1 includes a battery stack 100 and a control unit 21-22. Although the energy storage device 1 in FIG. 1 only includes one battery stack 100, the energy storage device 1 can include a plurality of battery stacks (100, 100', 100") connected in series to form a battery string 200 (FIG. 3) and several such battery strings (200, 200', 200") can further be connected in parallel (FIG. 4). The battery stack 100 includes a plurality of battery units 2-4 connected in series. Each battery unit in turn includes one or more parallel-connected battery modules 5-13, a bypass switch 14-16 connected in parallel with the battery modules 5-13 and a battery module supervision unit 17-20. Each battery module includes a plurality of battery cells (shown as a battery symbol in FIG. 1) connected in series with a module contactor 51-59.

The battery module supervision unit 17-20 is adapted to detect a failure in any of the battery modules 5-13 and to communicate with the control unit 21-22 via a communication link 30-32. To ensure isolation between the battery units which have different potential it is preferred to use optical fibers between the stack control unit and the battery unit. Upon detecting a failure in any of the battery modules 5-13 the battery module supervision unit 17-20 will send information on the failure to the control unit 21-22 which will decide whether to bypass the battery unit or not depending on a pre-programmed application dependent strategy. For example, if there are only two parallel-connected battery modules in each battery unit, the closing of the bypass switch must be performed automatically and as soon as possible. In other cases, the closing of the bypass switch can be determined case by case and depending on energy availability requirements etc.

In case the control unit decides to send a bypass order it is first sent to the battery module supervision unit 17-20 via the communication link 30-32. However, if the communication link 30-32 is broken, the battery module supervision unit 17-20 is unable to send information to the control unit 21-22 and the control unit is unable to send the bypass order to the bypass switch controller via the battery module supervision unit 17-20. In such cases, a communication management module (not shown in FIG. 1) in the battery module supervision unit 17-20 is adapted to detect when the communication link is broken and is able to, upon detecting that the link is broken, send a bypass order to the bypass switch controller 34-36 on its own volition after a predefined time delay. The time delay is necessary to give the main controller enough time to reduce the load current to zero.

The control unit is adapted to send bypass orders to the battery module supervision unit 17-20 so as to bypass the battery unit by closing the bypass switch 14-16 and consequently create a bypass for the load current upon receiving information that any of the battery modules in the battery unit has a failure. The control unit includes a main controller 22 and one or more stack control units 21 depending on the number of battery stacks (one stack control unit for each battery stack). FIG. 1 shows only one stack control unit 21 since only one battery stack is shown. The main controller 22 is adapted to control the entire power compensator including the whole energy storage device and is operatively connected to each of the stack control units.

Closing the bypass switch, thereby bypassing the battery unit, is performed by the respective battery module supervision unit 17-20 either by receiving a bypass order from the control unit 20-21 or on its own volition in case of a broken communication link as described above. The closing of the bypass switch should only be performed when no current flows in the battery unit in order to provide a safe bypass operation. To fulfill this requirement the closing of the bypass switch should not be performed unless all battery modules in the battery unit are disconnected. Disconnecting the battery modules is performed by opening the module contactors 51-59 when the load current through the battery modules have decreased below a threshold value. The battery module supervision unit will send information to the stack control unit when all the module contactors of the battery unit to be bypassed are open.

The opening of the bypass switch must always be performed manually and only when the battery stack has been disconnected in order to avoid unintentional opening of the bypass switch during operation. Once the bypass switch is closed any further operations must therefore be inhibited until the faulty module is replaced and the battery stack has been serviced. Therefore a bypass relay 25 is provided which is of a bistable type, for example a mechanically latched relay or a magnetically latched relay.

Figure 2:
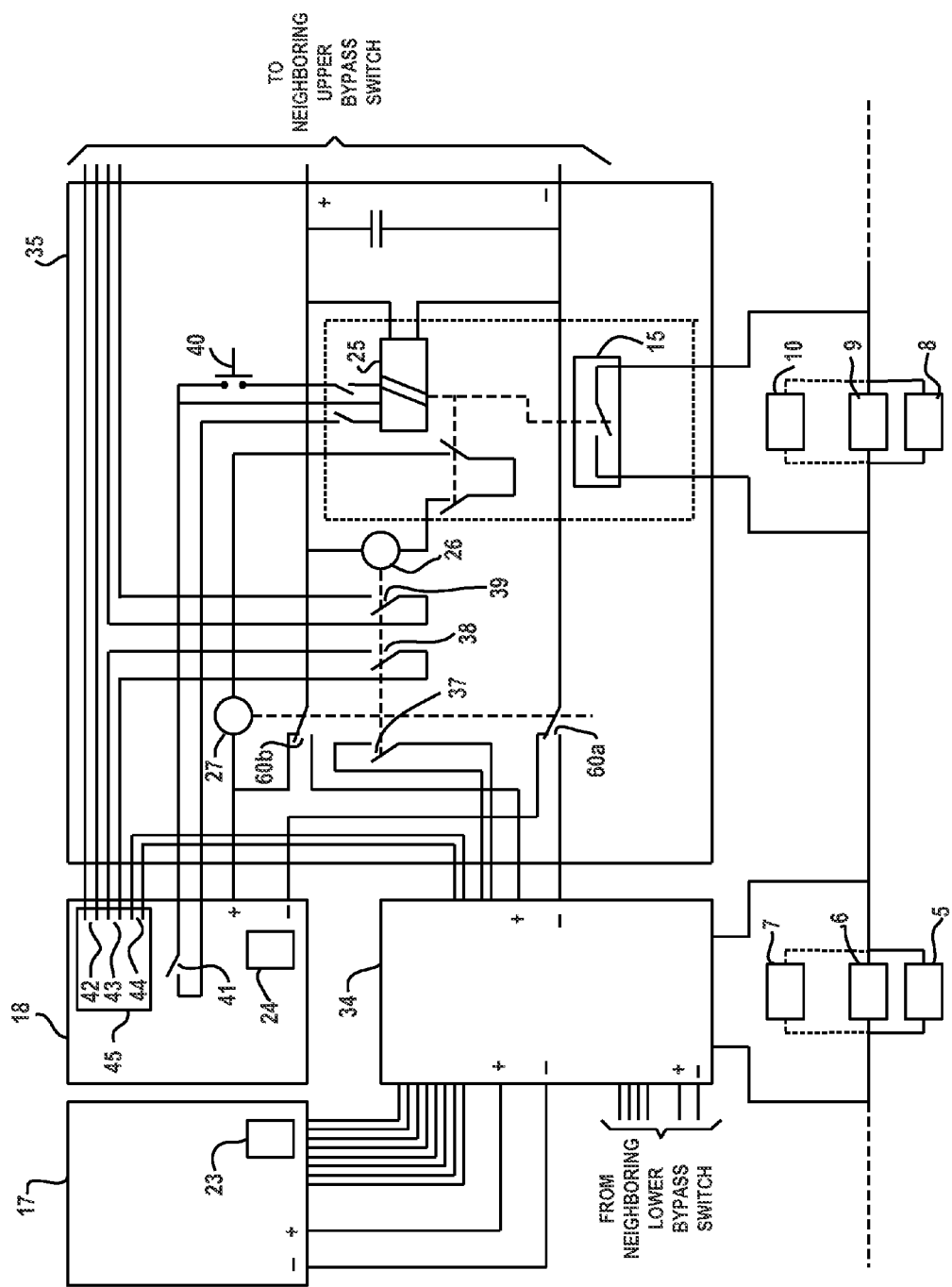
FIG. 2 shows two battery units in accordance with an embodiment of the present invention in more detail.

In FIG. 2 the two battery units 2, 3 from FIG. 1 are shown in more detail. The battery units 2-3 each includes three battery modules 5-10, a bypass switch controller 34-35 including a bypass switch 14-15, and a battery module supervision unit 17-18. Closing the bypass switch, thereby bypassing the battery unit is performed by the respective battery module supervision unit 17-18 either by receiving a bypass order from the control unit or in case the communication management module 23-24 detects a broken communication link as described in connection with FIG. 1 above.

The battery module supervision unit 17-18 initiates the closing of the bypass switch by closing a normally open potential free contact 41 after ensuring that all battery modules in the battery unit are disconnected. Disconnecting the battery modules is performed by opening the module contactors 51-59 when the load current through the battery modules have decreased below a threshold value. When the potential free contact 41 is closed the bypass relay 25 is operated and the bypass switch 15 is closed. The bypass switch controller 35 also includes an auxiliary relay 26 which will be operated when the bypass switch 15 is closed. The auxiliary relay 26 has a first relay contact 38 which is adapted to send information that the bypass switch 15 has been closed to the current controller 50 in the main controller 22 via a bypass detecting element 45 in the battery module supervision unit 18. The auxiliary relay 26 has further a second 37 and a third relay contact 39 which are adapted to send the same information to the bypass detecting elements (not shown in FIG. 2) in the neighbouring battery module supervision units (only one neighbouring battery module supervision unit 17 is shown in FIG. 2). This redundant information has the advantageous effect that the current controller 50 receives the status of the bypass switch, via the neighbouring battery module supervision unit, even if the communication link between the bypassed battery unit and the stack control unit is broken. Accordingly, each bypass detecting element 45 is adapted to receive three bypass detecting signals 42-44. As a consequence, an extra battery module supervision unit 20 (see FIG. 1) is included in the energy storage device 1 for the reasons mentioned above.

The information that the bypass switch 15 has been closed is used by the current controller 50 in the main controller 22 which is adapted to control the current through the battery stack. For safety reasons the current controller 50 will not increase the current through the battery stack until it has received information that the bypass switch has been successfully closed.

The re-opening of the bypass switch can only be performed if a button 40 is activated and there is a voltage supply available since the bypass relay 25 is bistable as mentioned above.

The bypass switch 25 is supplied with energy from its corresponding battery module supervision unit 18 to which it is connected. Each battery module supervision unit will provide terminals to supply a few watts at the battery unit voltage. In case the battery module supervision unit is out of function or for any other reason is not able to provide a voltage to the bypass switch controller, it is necessary to have an alternative supply to be able to close the bypass. This alternative supply could be provided from the neighbouring downstream battery module supervision unit 17 and a change over relay 27 is provided in order to change the energy source in case of faults. The extra battery module supervision unit 20 (see FIG. 1), included in the energy storage device 1, is provided as the alternative supply for the first battery unit in the stack.

The change over relay 27 is used to disconnect the bypassed battery module supervision unit 18 from the bypass switch controller 35 so that it does not need to supply the controller. The change over switch contacts 60*a-b* will also ensure that the battery unit 3 including the battery module supervision unit 18 can be bypassed through the battery module supervision unit 17 even if the battery module supervision unit 18 has a failure.

What is claimed is:

1. An energy storage device for a power compensator comprising:
  a battery stack including a plurality of battery units connected in series, each of the battery units comprising at least two parallel-connected battery modules including a plurality of battery cells, each battery unit further comprises a bypass switch connected in parallel with the battery modules;
  a control unit which is operatively connected to the bypass switches, said control unit receiving information on a failure in any of the battery modules and closing the bypass switch on a respective battery unit in order to bypass the battery unit in the event of a failure in any of the battery modules of the respective battery unit;
  wherein each battery unit comprises a battery module supervision unit communicating with the control unit via a communication link, said battery module supervision units detecting a failure in their respective battery modules; and a communication management module detecting a loss of communication between any of the battery module supervision units and the control unit and upon detecting a loss of communication, said communication management module closes the bypass switch in order to bypass the battery unit corresponding to the loss of communication.

2. The energy storage device according to claim 1, wherein the device further comprises:

a current controller adapted to control the current through the battery stack, each of the battery units includes a bypass detecting element detecting if the bypass switch is closed and upon detecting that the bypass switch is closed forwards information that the bypass switch is closed to said current controller, said current controller controlling the current through the battery stack based on the information received from the bypass detecting element.

3. The energy storage device according to claim 2, wherein the bypass detecting element sends the information that the bypass switch is closed to the communication management module of a neighbouring battery unit which forwards the information to the current controller.

4. An energy storage device for a power compensator comprising:

at least two parallel connected battery strings, each battery string including at least two series connected battery stacks, each battery stack including:

at least two battery units connected in series, each of the battery units having at least two parallel-connected battery modules, each battery unit including a bypass switch connected in parallel with the battery modules;

a control unit which is connected to the bypass switches, said control unit receiving information on a failure in any of the battery modules and closing the bypass switch on a respective battery unit in order to bypass the battery unit in the event of a failure in any of the battery modules of the respective battery unit;

wherein each battery unit comprises a battery module supervision unit coupled to said control unit, the battery module supervision units detecting a failure in their respective battery modules; and a communication management module detecting a loss of communication between any of the battery module supervision units and the control unit and upon detecting a loss of communication, said communication management module closes the bypass switch in order to bypass the battery unit corresponding to the loss of communication.

5. The energy storage device according to claim 4, wherein for each battery stack the device further comprises:

a current controller adapted to control the current through the battery stack, each of the battery units includes a bypass detecting element detecting if the bypass switch is closed and upon detecting that the bypass switch is closed forwards information that the bypass switch is closed to said current controller, said current controller controlling the current through the battery stack based on the information received from the bypass detecting element.

6. The energy storage device according to claim 5, wherein the bypass detecting element sends the information that the bypass switch is closed to the communication management module of a neighbouring battery unit which forwards the information to the current controller.

* * * * *